United States Patent [19]
Sullivan et al.

[11] Patent Number: 6,142,094
[45] Date of Patent: Nov. 7, 2000

[54] DEPTH SENSITIVE MECHANICAL ACOUSTIC SIGNAL GENERATING DEVICE

[75] Inventors: Edmund J. Sullivan, Portsmouth, R.I.; Robert W. Gauthier, Assonet, Mass.

[73] Assignee: The United States of America as represented by the Secretary of the Navy, Washington, D.C.

[21] Appl. No.: 09/313,311

[22] Filed: May 17, 1999

[51] Int. Cl.⁷ .................................................. G01L 19/00
[52] U.S. Cl. ........................... 116/70; 116/27; 116/268; 367/141
[58] Field of Search ................. 116/70, 27, 26, 116/200, 201, 209, 264, 266, 112, 268, 271, 272, DIG. 16.7; 367/131, 141, 142, 143, 146, 148, 910; 181/139, 142; 340/850

[56] References Cited

U.S. PATENT DOCUMENTS

| | | | |
|---|---|---|---|
| 3,053,220 | 9/1962 | Sawyer | 367/142 |
| 3,137,835 | 6/1964 | Bielecki et al. | 367/142 |
| 3,229,404 | 1/1966 | Abrahamsen et al. | 367/142 |
| 3,433,202 | 3/1969 | Sharp et al. | 116/27 |
| 3,560,913 | 2/1971 | Copley | 367/141 |
| 3,672,300 | 6/1972 | Axelson et al. | 116/137 R |
| 3,703,782 | 11/1972 | Brown | 116/209 |
| 4,095,667 | 6/1978 | Mahig et al. | 367/144 |
| 4,312,054 | 1/1982 | Holand | 367/142 |
| 5,233,570 | 8/1993 | Donskoy | 367/142 |

*Primary Examiner*—Andrew H. Hirshfeld
*Attorney, Agent, or Firm*—Michael J. McGowan; Robert W. Gauthier; Prithvi C. Lall

[57] ABSTRACT

A simple, mechanical device is provided which produces an acoustic signal at a specified depth. The device consists of a shear plug in an exterior wall of the device housing which prevents the movement of a spring biased piston. The plug is subjected to increasing differential pressure between the exterior and interior of the housing as the depth of the device beneath the water surface increases. At a known pressure differential, corresponding to a specified depth, the shear plug fails, allowing for the actuation of the piston. The spring biased piston strikes against a ledge in the device, creating the acoustic signal.

16 Claims, 2 Drawing Sheets

DEPTH SENSITIVE MECHANICAL ACOUSTIC SIGNAL GENERATING DEVICE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to acoustic signal generating devices, and more particularly to a mechanical device capable of generating an acoustic signal at a specific depth.

(2) Description of the Prior Art

Acoustic signals in active sonobuoys are produced by an array of active transducers that are driven electronically by means of a signal generator, a power source and an electric driver stage. The power source provides the necessary power to operate the signal generator and the electronic driver. Typically, the power source is a battery. The signal generator produces a specified signal and passes the signal to the driver stage where it is amplified so as to drive the active transducer array. The array produces the acoustic signal which is propagated through the water. Such electronically driven generators are complex, costly and have suffered from being unreliable. A simplified mechanically driven generator can reduce cost and can be made more reliable.

However, prior art mechanical sound generators are also typically complex, often relying on compressed gas or motors to actuate a striker against a plate. For example, U.S. Pat. No. 3,433,202 to Sharp et al. discloses an impact energized sound source which uses compressed gas to propel a striker through an evacuated guide tube and against a radiating plate. U.S. Pat. No. 3,137,835 to Bielecki et al. discloses an underwater mechanical sound generator resulting from the movement of motor driven pistons within the device. U.S. Pat. No. 3,053,220 to Sawyer discloses an underwater impact sound source having a dual spring-loaded impact rod. A free floating striker is attached to the rod while the springs and impact rod are each are mounted on telescoping tubes, all adding to the devices complexity. Also, the Sawyer device makes no provision for actuating the device at a specific depth. Other, similarly complex, and/or non-depth sensitive devices are disclosed by Abrahamsen et al. and Donsky in U.S. Pat. Nos. 3,229,404 and 5,233,570, respectively. In abandoned application Ser. No. 07/904,626, current inventor Sullivan disclosed a mechanical sound generator including a pressure sensitive piston which acted against two rods fixed end to end. The separation of the rods by the piston allowed a spring activated piston to strike a ledge, causing the acoustic signal. As the rods were fixed end to end, there was a distinct possibility that jarring of the device would cause premature actuation, especially as the device may be dropped into the water from a considerable distance. Also, the end to end configuration could lead to assembly problems when trying to align the rod ends.

SUMMARY OF THE INVENTION

Accordingly, it is an object of the present invention to provide a simple mechanical device which can generate an acoustic signal at a specified depth.

Another object of the present invention is to provide a device which is not susceptible to premature actuation when jarred.

Still another object of the present invention is to provide a device which can be easily assembled.

Other objects and advantages of the present invention will become more obvious hereinafter in the specification and drawings.

In accordance with the present invention, a depth sensitive, mechanical, acoustic signal generating device is provided. The device consists of a shear plug which prevents the movement of a spring biased piston. The plug is located in an exterior wall of the device housing so as to be subjected to increasing differential pressure as the depth of the device beneath the water surface increases. At a known pressure differential, corresponding to a specified depth, the shear plug fails, allowing for the actuation of the piston. The spring biased piston strikes against a ledge in the device, creating the acoustic signal.

The device thus described is a simple mechanical device having only four major components, i.e., a housing, a piston, a shear plug and a biasing means. The shear plug is designed to fail at a specific pressure, corresponding to a specified water depth. The simplicity of the device allows for quick assembly, and, once assembled, the device is not subject to premature actuation.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals refer to like parts and wherein.

DESCRIPTION OF THE PREFERRED EMBODIMENT

Figure 1:
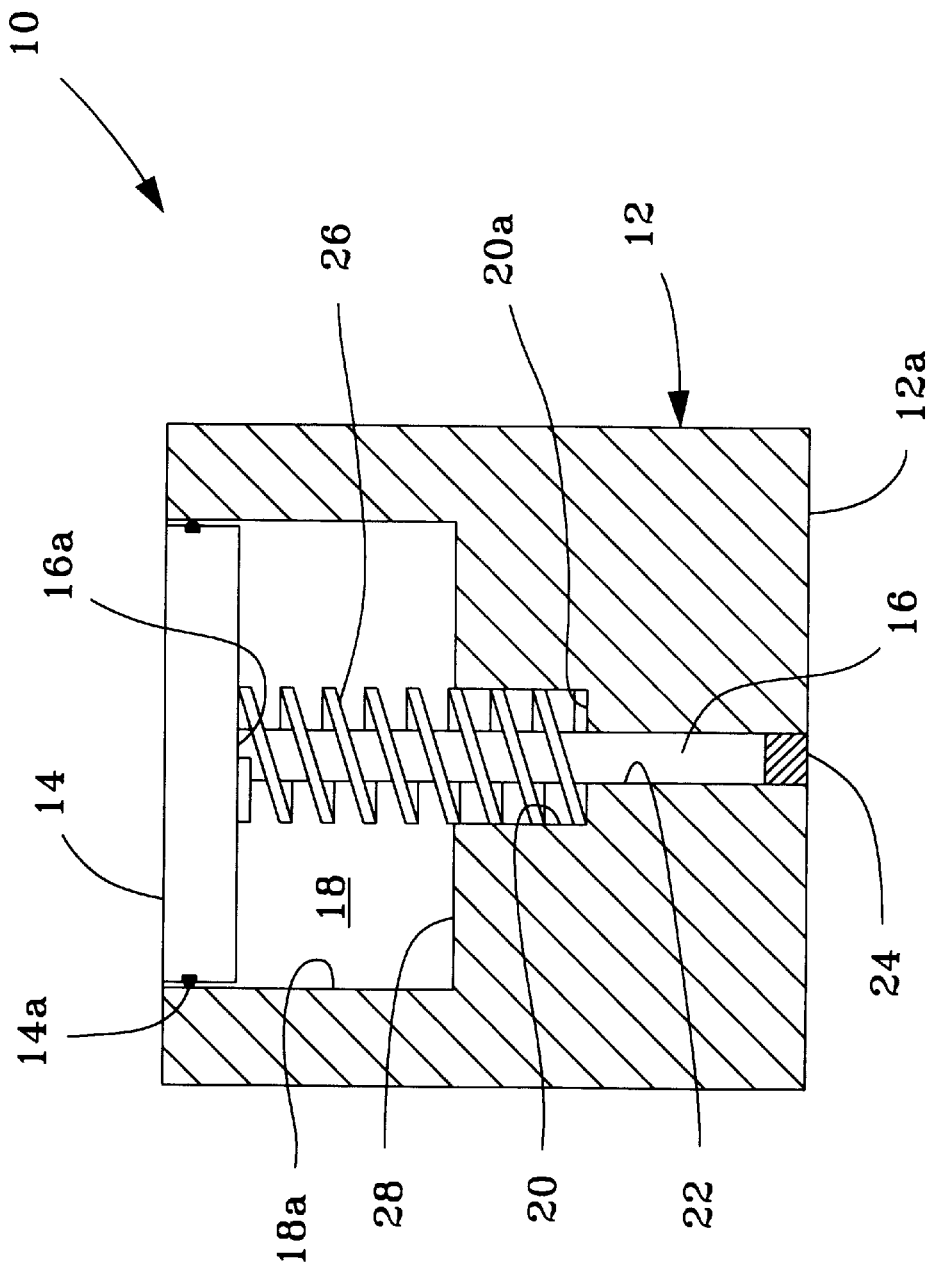
FIG. 1 is a cross sectional view of a preferred embodiment of the present invention.

Referring now to FIG. 1, there is shown a side sectional view of the present invention. The device 10 consists of a housing 12, preferably cylindrical, having a piston 14 and a rod 16 mounted within cylindrical chamber 18 of housing 12. One or more o-rings 14a provide a seal between piston 14 and chamber walls 18a. Rod 16 extends from the piston 14, through spring bore 20 and rod bore 22 and is seated against shear plug 24 which seals rod bore 22 at the base 12a of the housing 12. Shear plug 24 is designed to fail at a specified force, or load. As shown in FIG. 1, shear plug 24 is bonded within rod bore 22. The shear strength of the adhesive bond determines the failure load. A spring 26 is stretched and attached between the piston 14 and the housing 12 at spring bore 20, exerting a force against piston 14 to pull piston 14 toward shelf 28 of housing 12. When the device 10 is lowered in the water, water pressure against piston 14 results in rod 16 exerting a force against shear plug 24. The force resulting from the water pressure over the piston 14 is greater than the force exerted by the water pressure acting on shear plug 24 due to the larger area of the piston 14. At a predetermined depth, the force differential will cause the shear plug 24 to fail allowing rod 16 to pass through the bore 20, now left open by the failed shear plug 24. Spring 26 pulls piston 14 against shelf 28 with sufficient force to create an acoustic signal. It is noted that rod 16 fits snugly, but movably within bore 20 such that the piston 14 strikes shelf 28 evenly. Housing 12 can be fabricated from solid cylindrical stock with shelf 28 and bores 20 and 22 cut into housing 12. To assemble the device 10, the spring 26 is first attached at the base 20a of spring bore 20. Shear plug 24 is then inserted and fixed in rod bore 22. Next, rod 16 is placed within rod bore 22 and spring 26 is stretched and attached to rod 16 at its upper end 16a. Piston 14 is then attached to end 16a of rod 16.

Figure 2:
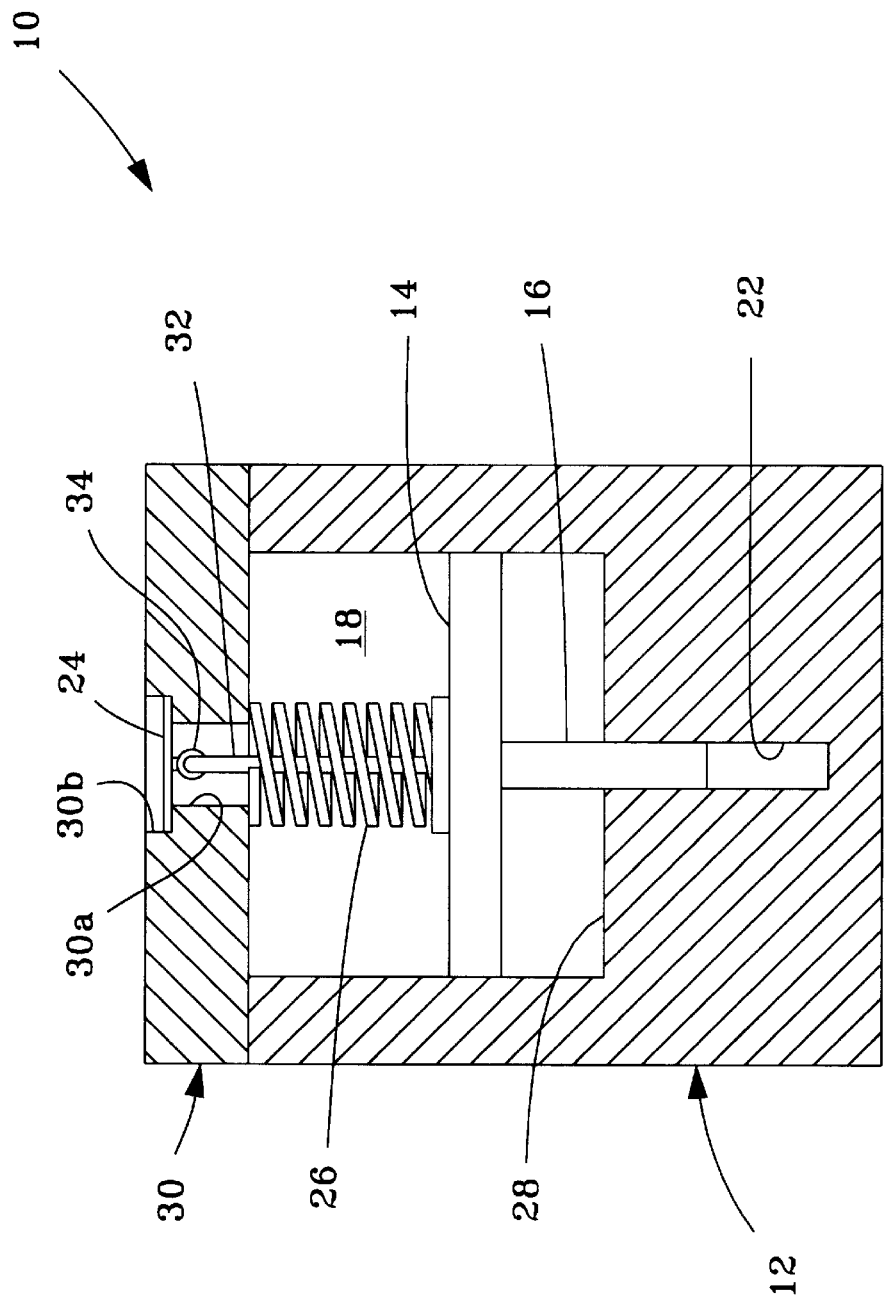
FIG. 2 is a cross sectional view of a second embodiment of the present invention.

FIG. 2 shows a side sectional view of a second embodiment of device 10. As in the embodiment of FIG. 1, piston 14 and rod 16 are mounted within cylindrical chamber 18 of housing 12. Rod 16 extends into rod bore 22 to help maintain the alignment of piston 14 within chamber 18. Shear plug 24 is shown incorporated into cover 30. Shear plug 24 is placed over cover bore 30a and seals cover bore 30a. The seal may be accomplished by o-rings (not shown), using the force of spring 26 to hold plug 24 against the o-rings. Shear plug 24 may also be bonded within depression 30b of cover 30. In the embodiment of FIG. 2, shear plug 24 is designed to fail by shearing at a specified force. Hook 32 is attached to piston 14. Hook 32 engages eye 34 attached to shear plug 24, with spring 26 compressively engaged between cover 30 and piston 14. To assemble device 10 of the embodiment of FIG. 2, shear plug 24, with attached eye 34, is first sealed into cover 30. Spring 26 is then placed over hook 32, spring 26 is compressed and hook 32 is attached to eye 34. The cover assembly, consisting of cover 30, shear plug 24, hook 32, eye 34, spring 26, piston 14 and rod 16, is then sealingly attached to housing 12, making sure rod 16 and piston 14 are aligned within rod bore 22 and chamber 18. Cover 30 may be sealed to housing 12 by bonding, o-rings (not shown), bolts (not shown), threads (not shown), or other well known means. When the pressure against shear plug 24 due to the water depth increases beyond the failure point of shear plug 24, shear plug 24 fails, releasing spring 26, which forces piston 14 against shelf 28 to create the acoustic signal.

The shear plug and piston mechanism of the present invention provides a simple means for mechanically generating an acoustic signal. The components are easily assembled, without the requirement of matching the ends of relatively narrow rods. The device is rugged, with little chance of prematurely activating due to rough handling.

Although the present invention has been described relative to specific embodiments thereof, it is not so limited. As described for the embodiments of FIGS. 1 and 2, the shear plug can be made to fail at a specified depth by any one of many well known methods. The embodiment of FIG. 1 is bonded in place with the bonding having a known shear strength. In the embodiment of FIG. 2, the shear plug itself is designed with a known shear strength. The shear plug may also be fabricated directly into the housing, or into the cover for the embodiment of FIG. 2, by notching the housing or cover in such a manner as to cause failure at a certain pressure. In addition, the housing can also be cast with the shelf and bores already in place rather than being bored. The device may also be constructed with other than the spring biasing means of FIGS. 1 and 2, e.g., rubber bands or other elastomeric compounds may be used.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A device for generating an acoustic signal comprising:
   a housing having an interior chamber;
   a piston movably mounted within the housing chamber;
   a means for biasing the piston in a direction towards a piston seat within the housing chamber; and
   a plug for sealing an opening to the housing chamber, the plug retaining the piston in a position distant from the piston seat, the plug failing in response to a pressure differential between the chamber and an environment exterior to the housing, failure of the plug releasing the piston towards the piston seat, the piston striking the piston seat to generate the acoustic signal.

2. The acoustic signal generating device of claim 1 wherein the plug is bonded within the opening, the bond breaking at a predetermined differential pressure to release the piston.

3. The acoustic signal generating device of claim 1 wherein the pressure differential creates a shear force within the plug, failure of the plug at a predetermined shear force releasing the piston.

4. The acoustic signal generating device of claim 1 further comprising a rod attached to the piston and extending from the piston, within the chamber and into the opening to be in contact with the plug, the action of the rod against the plug retaining the piston.

5. The acoustic signal generating device of claim 4 wherein the plug is bonded within the opening, the bond breaking at a predetermined differential pressure to release the piston.

6. The acoustic signal generating device of claim 5 wherein the biasing means comprises a spring attached between the piston and the piston seat, the spring surrounding the rod.

7. The acoustic signal generating device of claim 6 wherein the piston seat further comprises a depression for containing the spring when the piston strikes the piston seat.

8. The acoustic signal generating device of claim 6 wherein the piston forms a seal between the chamber and the exterior environment, the piston being disposed at an end of the chamber opposite the opening.

9. The acoustic signal generating device of claim 1 wherein the piston forms a seal between the chamber and the exterior environment, the piston being disposed at an end of the chamber opposite the opening.

10. The acoustic signal generating device of claim 1 wherein the biasing means comprises a spring attached between the piston and the piston seat.

11. The acoustic signal generating device of claim 10 wherein the piston seat further comprises a depression for containing the spring when the piston strikes the piston seat.

12. The acoustic signal generating device of claim 1 wherein the plug is disposed within a cover portion of the housing, the opening extending through the cover portion, the cover portion with the plug forming a seal between the chamber and the exterior environment at an end of the chamber opposite the piston seat.

13. The acoustic signal generating device of claim 12 further comprising:
   a rod attached to the piston and extending from the piston in a direction towards the piston seat;
   a rod bore within the piston seat, the rod extending partially into the rod bore when the piston is retained by the plug, the rod extending fully into the rod bore when the piston strikes the piston seat.

14. The acoustic signal generating device of claim 12 wherein the biasing means is a spring attached between the cover and the piston.

15. The acoustic signal generating device of claim 12 further comprising:

a hook attached to the piston; and an eye attached to a side of the plug exposed to the chamber, the hook engaging the eye to retain the piston.

16. A device for generating an acoustic signal comprising:

a housing having an interior chamber;

a piston movably mounted within the housing chamber;

a spring biasing the piston in a direction towards a piston seat within the housing chamber;

a plug for sealing an opening to the housing chamber, the plug being subjected to a differential pressure between the chamber and an environment exterior to the housing;

a hook attached to the piston; and an eye attached to a side of the plug exposed to the chamber, the hook engaging the eye to retain the piston in a position distant from the piston seat, the pressure differential creating a shear force within the plug, failure of the plug at a predetermined shear force releasing the piston to strike the piston seat and generate the acoustic signal.

* * * * *